Patented Oct. 8, 1940

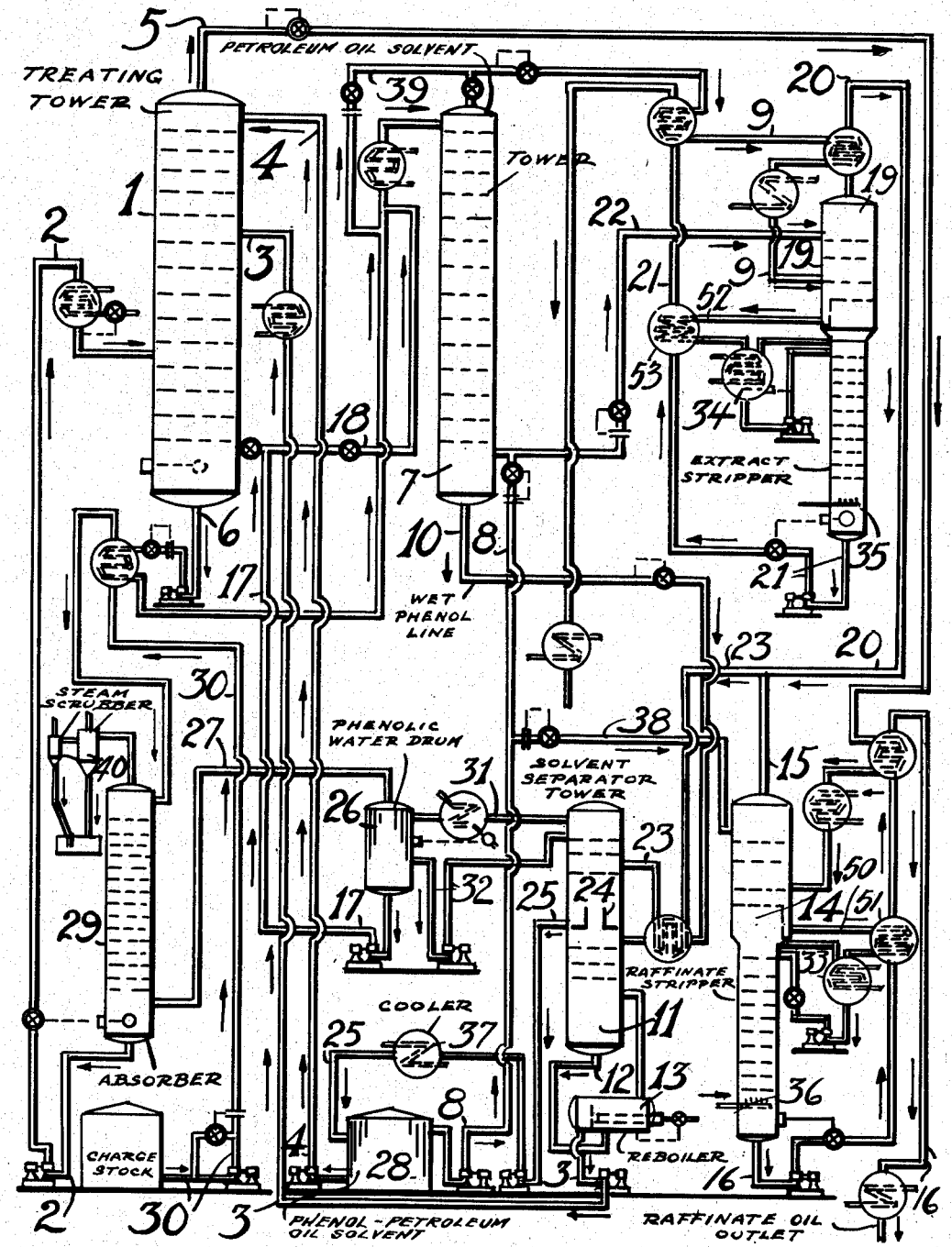

2,216,933

UNITED STATES PATENT OFFICE 2,216,933

SOLVENT TREATING PROCESS

George T. Atkins, Jr., Highlands, Tex., assignor to Standard Oil Development Company, a corporation of Delaware Application June 15, 1938, Serial No. 213,771

11 Claims. (Cl. 196—13)

The present invention relates to an improved process for solvent treating mineral oils. The invention especially relates to the solvent treatment of petroleum oils with a solvent selected from the class which has a preferential selectivity for the more aromatic type compounds as compared to the more paraffinic type compounds. The process of the present invention especially relates to an improved sequence of steps in the solvent treatment of a petroleum oil and is concerned with the use and recovery of a solvent, the major proportion of which is not distilled and the minor proportion of which is distilled. The invention further relates to the introduction in a countercurrent treating tower of the undistilled solvent at a point different from the point of introduction of the distilled solvent.

It is well known in the art to separate mineral oils, particularly petroleum oils, into relatively more aromatic and into relatively more paraffinic fractions by various selective solvents contacted with the oil in various processes. It is also well known in the art to re-extract a primary solvent extract by contacting the solvent-extract solution with a secondary solvent which has a preferential selectivity for the extract rather than for the primary solvent. An example of the use of petroleum naphtha as such a secondary solvent is disclosed in U. S. Patent 1,878,022 to R. K. Stratford.

One object of the present invention is to secure an improvement in the process whereby the desired result can be obtained with a greater degree of economy than has heretofore been possible. This greater degree of economy is obtained by recovering primary solvent, for re-use in the treating step, in two streams, one of which is distilled primary solvent used for a final purification of the raffinate and the other of which is undistilled primary solvent, imperfectly purified by contact with secondary solvent, which is used for dissolving the greater part of the extract. The process comprises solvent treating a mineral oil charge stock in a countercurrent tower serving as a primary treater and using a primary solvent which preferentially dissolves the more aromatic and naphthenic components, producing a raffinate solution and a solvent-extract solution, treating the solvent-extract solution with a secondary solvent in a second countercurrent treater, producing a secondary extract solution and an undistilled primary solvent from said secondary treater, returning the undistilled primary solvent to the primary treater at a point intermediate between the point of addition of mineral oil charge stock and the point of removal of raffinate solution, distilling primary and secondary solvents from the raffinate and extract solutions, recovering raffinate and extract as final streams which are removed from the process, subjecting the distilled solvents to liquid phase separation, returning distilled primary solvent to the primary treater at a point intermediate between the point of addition of undistilled primary solvent and the point of removal of raffinate solution, and returning secondary solvent to the secondary treater for treating the solvent-extract solution as described above. A practical and preferred modification of this process, in the case of certain charge stocks, comprises introducing into the primary treater at a point or points above or below the point of addition of mineral oil charge stock a solvent modifying component, such as water, which reduces the solvency power of the primary solvent, subjecting the undistilled primary solvent issuing from the secondary treater and containing said component to a distillation process in which said solvent modifying component is distilled and in which the primary solvent is not distilled, and introducing the distilled component and undistilled primary solvent into the primary treater as described above.

The process of the present invention may be clearly understood by reference to the attached drawing showing one modification of the same. For purposes of this illustration, it is assumed that a lubricating oil fraction is being solvent treated with phenol as a primary solvent, that water is being used to modify the solvency power of the phenol, and that the solvent-extract solution is being countercurrently re-extracted with a highly paraffinic petroleum hydrocarbon solvent having an average boiling point substantially equal to that of phenol. The lubricating oil charge stock is introduced through line 30 into absorber 29 in which it flows downwardly intimately contacting upflowing quantities of phenol and petroleum oil solvent vapors which are introduced into absorber 29 by means of vapor line 27. The raw feed material after scrubbing out the phenol and petroleum oil solvent from the steam vapors is then led by means of line 2 into the lower part of treating tower 1. The oil flows upwardly through tower 1 intimately contacting in the first stages undistilled phenol which is introduced into tower 1 by means of line 3. After passing the point of introduction of the undistilled phenol, the oil is then contacted with distilled phenol which is introduced into tower 1 by means of line 4.

The phenol-extract solution is withdrawn from the bottom of tower 1 by means of line 6 and then introduced into a second extracting tower 7. The phenol extract solution flows downwardly through tower 7 intimately contacting the upflowing petroleum oil solvent, introduced into absorber 7 by means of feed line 8, which removes from the phenol extract the larger percentage of the extract.

The phenol leaving the bottom of absorber 7 by means of take-off line 10 is termed "wet phenol." This phenol passes through suitable heat exchange equipment and is then introduced into a solvent separator tower 11 under suitable temperature conditions to remove most of the water. This phenol stream is introduced into a stripping section of tower 11 in which most of the water is removed and flows as vapor through the chimney 24 in tower 11, whereas the stripped phenol is withdrawn from tower 11 by means of line 12 and is introduced into a reboiler 13 where it is dried to the desired degree. The undistilled phenol treated in this manner is then withdrawn from reboiler 13 by means of line 3 and fed into the main treating tower 1.

The raffinate solution from treating tower 1 is suitably heated by exchanger equipment and is then led into raffinate stripper 14 by means of feed line 5. The raffinate is introduced into tower 14 at temperatures under which the phenol and petroleum oil solvent content of the raffinate solution is vaporized. The unvaporized portions contact the hot vapors and steam rising from the stripping section producing further vaporization. The remaining liquid is withdrawn by means of line 50, passed through suitable heat exchanger equipment 51 and tubular steam unit 33 where it is further heated by steam. The hot unstripped raffinate is pumped into the stripping section of 14 where the final removal of phenol and petroleum oil solvent is accomplished by means of steam introduced through line 36. The phenol-free and petroleum oil solvent stripped raffinate is then withdrawn from tower 14 by means of take-off line 16.

The extract solution from the top of absorber 7 is similarly heated in suitable heat exchanger equipment and is then introduced into extract stripper 19 by means of feed line 9. Combined with the extract solution to be heated is a portion of the phenol-extract solution withdrawn from line 6 and by-passed around tower 7 through line 39 for the purposes of increasing the ratio of distilled to undistilled phenol and preventing excessive accumulation of material not extractable in tower 7. The extract is introduced under such temperature and pressure conditions that the greater part of the phenol and petroleum oil solvent are vaporized and taken overhead by means of vapor line 20. The unvaporized portion contacts steam and hot vapors rising from the stripping section of tower 19 producing further vaporization. The extract liquid is withdrawn by means of line 52, passed through heat exchanger equipment 53 and steam unit 34 in which the material is further heated. The heated material is then introduced back into the stripping section of extract stripper 19 for final removal of phenol and petroleum oil solvent by means of steam introduced through line 35. The stripped extract is removed from extract stripper 19 by means of take-off line 21.

The vapors from extract stripper 19 and from raffinate stripper 14 taken overhead by means of lines 20 and 15 are combined and are led into solvent stripping tower 11 by means of line 23. These vapors are almost completely condensed and enter the rectifying section of the solvent separating tower 11. Substantially all the distilled phenol condenses in the accumulator section of 11 along with the petroleum oil solvent and some water. Since the quantity of water is determined by the temperature maintained in the accumulator section and since the principal component in the accumulator is petroleum oil solvent, having little solvency for water, the solvent power of the distilled phenol is easily adjusted. The conditions are regulated so that the phenol and petroleum oil solvent in the accumulator section will layer when cooled. The liquid from the accumulator section is withdrawn by means of take-off line 25 and led through cooler 37 into the phenol-petroleum oil solvent storage 28 in which the respective phenol and petroleum oil solvent phases readily separate. The distilled phenol is removed from the bottom of tank 28, together with any necessary make-up phenol, by means of line 4 and is recycled into treating tower 1. The petroleum oil solvent phase is taken from the upper section of tank 28 and is led into absorber 7 by means of line 8. Part of the petroleum oil solvent phase from storage tank 28 is introduced into extract stripper 19 by means of line 22 and into raffinate stripper 14 by means of line 38 as reflux.

The temperature on the top plate of the rectifying section of solvent separator tower 11 is such that three components, water, phenol and petroleum oil solvent, are present. These components are taken in the vapor state from tower 11 through vapor line 31, are cooled and are then introduced into the phenolic water drum 26. Sufficient condensation occurs to maintain a proper balance of water within the treating system. Uncondensed water and phenol vapor are passed through vapor line 27 into the lower part of absorber 29 where phenol is stripped from the ascending vapor by the fresh charge stock. Steam introduced in towers 14 and 19 by stripper-jets 36 and 35, is withdrawn through steam scrubber 40. Reflux containing condensed petroleum oil solvent is pumped back from phenolic water drum 26 to solvent separator 11 by means of line 32. Condensed phenolic water is withdrawn from the bottom of phenolic water drum 26 and is injected into treating tower 1 by means of line 17. Phenolic water may also be introduced into the phenol extract from tower 1 prior to its entrance into tower 7 by means of line 18.

The process of the present invention may be widely varied and conditions may be adjusted, depending upon the particular feed stock being treated, the particular solvent or solvent mixture being used and upon the volume of solvent used per volume of oil being treated. A wide variation in the physical properties of the petroleum oil solvent may be made for various cases. However, a type of petroleum oil solvent particularly advantageous in the solvent refining of mineral oils is a hydrocarbon mixture of petroleum origin having a midboiling point between 200° F. and 500° F. and containing minimum amounts of those hydrocarbon components which are especially soluble in the primary solvent. A preferred petroleum oil solvent fraction is a highly paraffinic heavy naphtha boiling in the range from about 200° to 600° F., having an average boiling point in the range from about 360° to 400° F. It is desirable to select a boiling range and midboiling point for the petroleum oil solvent to be used such that primary and secondary solvents, when present together in either raffinate or extract, can be recovered by distillation.

The temperatures maintained on the respective towers will, of course, depend upon the particular stock being treated, the solvents being used, as well as upon the quality of the products desired. For example, when treating a lubricating oil stock with phenol in the primary tower and re-extracting the solvent extract with a petroleum oil solvent fraction having an average boiling point of about 350° to 400° F., the following temperatures are desirable. The temperature of treating tower 1 is maintained in the range between 125° to 250° F., preferably in the range from 130° to 165° F. For example, in the particular case described, preferred temperatures in solvent treating tower 1 are to have a bottom temperature of about 165° F., a temperature of about 165° F. at the point of introduction of the undistilled phenol, and a temperature of about 150° F. at the point of introduction of the distilled phenol. Under these conditions the distilled phenol is introduced at a temperature of about 120° F., the undistilled phenol is introduced at a temperature of about 165° F., and the phenolic water is introduced at a temperature of about 130° F. It is preferred to cool the phenol extract taken off from tower 1 to a temperature of about 120° F. The respective quantities of distilled and undistilled phenol used in tower 1 may also vary within wide limits, depending upon the stock being treated and the quality of products desired. For example, when using phenol, the quantity of undistilled phenol used is in the range from 60% to 95% of the total solvent being used, preferably in the range from 70% to 90%.

The temperature and pressure conditions maintained on the petroleum oil solvent absorber will likewise depend upon the solvent being used as well as upon the constituents and characteristics of the phenol extract from treating tower 1. When solvent treating a lube oil with phenol under the conditions mentioned for tower 1 and when using a petroleum oil solvent having an average boiling point of about 360° F., it is preferred to have a temperature somewhere in the range from 100° to 130° F. The temperatures at which the raffinate from tower 1 and the petroleum oil solvent extract from tower 7 are introduced in the extract and raffinate strippers will also depend upon the constituents and upon the respective quantities previously used. In general the temperatures are maintained in the range to substantially free the raffinate and extract from phenol and petroleum oil solvent. Preferred temperatures are in the range from 300° to 330° F. which will cause most of the phenol and petroleum oil solvent to vaporize immediately. The stripping sections of the extract and raffinate strippers are preferably maintained at a temperature of around 400° to 500° F. at an absolute pressure of about 200 mm. of mercury. The vapors taken overhead in the extract and raffinate strippers are then cooled from about 240° F. by heat exchange with undistilled phenol from the secondary treater, so that the greater part of the vapors are condensed before introduction into the solvent separator 11. The wet phenol from tower 7 containing some recycled extract, that is, oil which remains dissolved in the phenol after countercurrent extraction with petroleum oil solvent, is also introduced after being heated by suitable heat exchange equipment into tower 11. The recycle oil in the wet phenol may be reduced to any desired extent, depending upon the quantity of petroleum oil solvent used. It is preferred, however, for economical purposes to allow some recycle oil to remain in the wet phenol since it will require unduly large quantities of petroleum oil solvent to remove the last traces.

The wet phenol is preferably introduced into the solvent separating tower at a temperature to secure the desired drying of the phenol. It is desirable to have a temperature somewhere in the range from 140° to 180° F., preferably at about 160° F. The undistilled phenol withdrawn from tower 11 by means of line 12 is dried to any desired extent in reboiler 13. The solvent power of the undistilled phenol will be controlled by the temperatures maintained in this reboiler. If the temperature is raised, the solvent will be hotter and drier and will remove additional extract from the lube oil, giving a lower yield of a higher quality raffinate, whereas if the temperature is lowered the solvent will be cooler and will contain more water and a higher yield of a lower viscosity index lube raffinate will be obtained. The temperature of the accumulator section of tower 11 is maintained by means of reflux pumped to the top plate of the tower. This temperature is adjusted to secure the desired amount of water in the distilled phenol and to assist in securing phase separation of the petroleum oil solvent and phenol. It is preferred to maintain this temperature in the range from 140° to 180° F. The temperature of the top plate under these conditions is maintained at about 135° F. and the pressure at about 140 mm. The vapors taken from tower 11 by means of line 31 are substantially all condensed in phenolic water drum 26 with the exception of water vapor equivalent to the amount of steam used in the extract and raffinate strippers.

In order to further demonstrate the invention, the following example is given and is not to be construed as limiting the invention in any manner whatsoever.

EXAMPLE 1

A lubricating oil distillate from Coastal crude having a gravity of 21.8° A. P. I. was solvent extracted with phenol in accordance with the process of the present invention.

The petroleum oil solvent used for re-extraction was a blend consisting of 60% by volume of kerosene refined by extraction with liquid sulfur dioxide and 40% by volume of kerosene from Rodessa crude. This petroleum oil solvent had the following inspections:

TABLE 1

| | |
|---|---|
| Gravity, °A. P. I. | 50.0 |
| A. S. T. M. distillation: | |
|   I. B. P., °F. | 310 |
|   F. B. P., °F. | 450 |
|   50% at, °F. | 360 |

The operating temperatures maintained on the primary tower were as follows:

TABLE 2

Primary tower:
Point of introduction of distilled phenol _____ °F__ 150
Point of introduction of undistilled phenol _____ °F__ 165
Point of introduction of oil charge stock _____ °F__ 165
Bottom of tower _____ °F__ 165

A temperature of 120° F. was maintained on tower 7 and approximately 22% of the solvent extract from the primary tower was by-passed around the tower 7. The undistilled phenol was recovered by flashing at an absolute pressure of 150 mm. at a temperature of 167° F. The distilled phenol was recovered by distilling at an absolute pressure of 145 mm. at a temperature of 170° F. The results of this operation are summarized in the following tables:

TABLE 3

*Material balance*

Basis: 100 parts by volume, oil charge stock

|  | Parts by volume charged | Parts by volume recovered |
|---|---|---|
| Oil feed | 100 | 0 |
| Raffinate | 0 | 67.0 |
| Extract | 0 | 32.3 |
| Distilled phenol | 72 | 73.5 |
| Undistilled phenol | 160 | 158.0 |
| Phenolic water | 10 | 7.8 |
| Petroleum oil solvent | 87 | 87.3 |

TABLE 4

*Intermediate streams*

| | Parts by volume |
|---|---|
| Raffinate solution | 123.0 |
| By-passed extract | 48 |
| Phenol-extract solution to secondary treater | 171.4 |
| Undistilled phenol from secondary treater | 167.4 |
| Extract solution (including by-passed extract) | 139 |

TABLE 5

*Quality of oil charge and products*

|  | Charge | Raffinate | Extract |
|---|---|---|---|
| Gravity, °A. P. I. | 21.8 | 25.9 | 13.9 |
| Open cup flash, °F | 400 | 405 | 350 |
| Saybolt Universal viscosity— | | | |
| At 100° F | 475 | 323.5 | 1497 |
| At 210° F | 54 | 50.3 | 68.5 |
| Viscosity index | 36 | 63.7 | −69.8 |
| Neutralization value | 0.73 | 0.14 | 1.88 |

EXAMPLE 2

One operation further illustrating the invention in accordance with the process as described is as follows:

On the basis of 100 volumes of lubricating oil feed to the primary tower, the respective streams are as follows:

TABLE 6

*Treating tower*

|  | Material in | | | | Material out | |
|---|---|---|---|---|---|---|
|  | Lube feed line 2 | Distilled phenol line 4 | Undistilled phenol line 3 | Phenolic water line 17 | Raffinate line 5 | Phenol extract line 6 |
| Oil | 100 | | | | | |
| Phenol | | 30 | 170 | 1 | 25 | 176 |
| Petroleum oil solvent | | 7 | 19 | | 26 | |
| Water | | 2 | 7 | 9 | | 18 |
| Recycle extract oil | | | 7 | | | 7 |
| Raffinate oil | | | | | 65 | |
| Extract | | | | | | 35 |
| Total | 100 | 39 | 203 | 10 | 116 | 236 |
|  |  | 352 |  |  | 352 |  |

TABLE 7

*Petroleum oil solvent absorber*

|  | Material in | | Material out | |
|---|---|---|---|---|
|  | Phenol extract line 6 | Petroleum oil solvent line 8 | Wet phenol line 10 | Petroleum oil solvent extract line 9 |
| Phenol | 176 | 15 | 177 | 14 |
| Water | 18 | | 18 | |
| Recycle extract | 7 | | 7 | |
| Extract | 35 | | | 35 |
| Petroleum oil solvent | | 80 | 23 | 57 |
| Total | 236 | 95 | 225 | 106 |
|  | 331 |  | 331 |  |

TABLE 8

*Extract stripper*

|  | Material in | | | Material out | |
|---|---|---|---|---|---|
|  | Petroleum oil solvent extract line 9 | Petroleum oil solvent reflux line 22 | Stripping steam line 35 | Stripped phenol line 21 | Vapors line 20 |
| Phenol | 14 | 1 | | | 15 |
| Petroleum oil solvent | 57 | 9 | | | 66 |
| Extract | 35 | | | 35 | |
| Water | | | 1 | | 1 |
| Total | 106 | 10 | 1 | 35 | 82 |
|  | 117 |  |  | 117 |  |

TABLE 9

*Raffinate stripper*

|  | Material in | | Material out | |
|---|---|---|---|---|
|  | Raffinate line 5 | Stripping steam line 36 | Stripped raffinate line 16 | Vapors line 15 |
| Phenol | 25 | | | 25 |
| Petroleum oil solvent | 26 | | | 26 |
| Raffinate oil | 65 | | 65 | |
| Water | | 2 | | 2 |
| Total | 116 | 2 | 65 | 53 |
|  | 118 |  | 118 |  |

TABLE 10
Solvent separator tower

| | Material in | | | Material out | | |
|---|---|---|---|---|---|---|
| | Vapors from extract and raffinate strippers line 23 | Wet phenol line 10 | Reflux line 32 | Vapors line 31 | Distilled phenol petroleum oil solvent line 25 | Undistilled phenol line 3 |
| Phenol | 40 | 177 | 1 | 2 | 46 | 170 |
| Petroleum oil solvent | 92 | 23 | 4 | 4 | 96 | 19 |
| Water | 3 | 18 | 6 | 18 | 2 | 7 |
| Recycle oil | | 7 | | | | 7 |
| Total | 135 | 225 | 11 | 24 | 144 | 203 |
| | 371 | | | | 371 | |

TABLE 11
Phenolic water drum

| | Material in | Material out | | |
|---|---|---|---|---|
| | Vapors from solvent separator line 31 | Reflux to solvent separator line 32 | Phenolic water to treating tower line 17 | Uncondensed water line 27 |
| Water | 18 | 6 | 9 | 3 |
| Phenol | 2 | 1 | 1 | |
| Petroleum oil solvent | 4 | 4 | | |
| Total | 24 | 11 | 10 | 3 |
| | 24 | | 24 | |

TABLE 12
Petroleum oil solvent storage

| | Material in | Material out | | |
|---|---|---|---|---|
| | Phenol petroleum oil solvent from solvent separator line 25 | Distilled phenol to treating tower line 4 | Petroleum oil solvent to petroleum oil solvent absorber line 8 | Petroleum oil solvent to reflux to extract stripper line 22 |
| Water | 2 | 2 | | |
| Phenol | 46 | 30 | 15 | 1 |
| Petroleum oil solvent | 96 | 7 | 80 | 9 |
| Total | 144 | 39 | 95 | 10 |
| | 144 | | 144 | |

The above method of operation may be varied widely as to temperatures as well as to respective quantities used. However, such variation must, for practical and economical reasons, be limited for each particular case. For example, it would not be practical to raise the operating temperatures of the primary treater, shown in Example 1, above 165° F. because excessive mutual solubility of the phases in the primary treater would result. Similarly, upper temperature limits can be expected for each combination of mineral oil charge stock and primary solvent. Moreover, such upper limit is influenced greatly by the amount of added water and the point of introduction into the primary treater. In certain cases it is especially desirable to allow petroleum oil solvent to enter the primary treater dissolved in the oil feed stock and primary solvent, the benefits resulting therefrom being reduction in the viscosity of the oil phase, an increase in the difference in specific gravity between the solvent and oil phases, and an increase in the solubility of high molecular weight extract oil fractions in the solvent phases.

In selecting the relative ratios of distilled and undistilled solvents and of petroleum oil solvent for any particular case of solvent treating mineral oils, an optimum choice should be based upon the relative difficulty of recovering extract solution from solvent extract solution by countercurrent extraction with petroleum oil solvent as influenced by the degree of solubility of the more undesirable components of the extract. Thus for solvent refining mineral oils derived from Pennsylvania type crudes, smaller amounts of both distilled solvent and petroleum oil solvent than those shown in the example could be advantageously employed. No restriction need be placed upon the nature of, physical properties of, origin of, or previous or subsequent processing of the mineral oil charge stock other than that it contain a relatively more paraffinic fraction and a relatively more aromatic or naphthenic fraction, that the main body of oil be not completely miscible with the primary solvent at the treating temperature and in the presence of that quantity of water contained in the primary treater, and that primary solvent be separable by distillation or by a combination of distillation and layering from raffinate and extract.

More especially the present invention is an improvement, for economic reasons, over those processes in which the entire body of solvent is distilled before reuse. Only a minor proportion of the total primary solvent need be distilled. The petroleum oil secondary solvent has a relatively lower latent heat of vaporization than primary solvent, and water diluent contained in undistilled primary solvent need not be distilled. For these reasons the heat consumption of the process is relatively low which is in itself an economic advantage and which in addition is associated with and results in reduced initial plant investment.

The above invention is not to be limited by any theory or mode of operation, but only by the following claims in which it is desired to claim all novelty insofar as the prior art permits.

I claim:

1. Process of solvent treating a mineral oil comprising first contacting said oil with a major proportion of a solvent which has not been distilled and then contacting said oil between the point at which said major proportion of said solvent is introduced and the raffinate phase withdrawn with a minor proportion of said solvent which has been distilled, under conditions to form a raffinate phase and a solvent extract phase, separating the raffinate phase and removing the solvent therefrom by distillation, recycling said distilled solvent as said minor proportion of said solvent, separating the solvent extract phase and recovering the solvent therefrom by removing the extract with a secondary solvent, and recycling the recovered solvent from the solvent extract phase as said major proportion of said solvent.

2. Process in accordance with claim 1 in which said major proportion of said solvent is from 60 to 95%.

3. Process in accordance with claim 1 in which said solvent is phenol and in which said major proportion of said solvent is from 60 to 95%.

4. Improved process of solvent treating mineral oils comprising solvent treating a mineral oil charge stock in an initial countercurrent main treating tower in a continuous manner with a primary solvent, the major quantity of which has not been distilled, producing a raffinate solution from the top and a solvent extract solution from the bottom, re-extracting the solvent extract solution in a second countercurrent phase treating tower with a secondary solvent having a preferential selectivity for the original extract, removing an extract solution from the top of said second countercurrent phase treating tower and primary solvent from the bottom of said tower, drying the primary solvent to the desired extent in a stripping section and returning the undistilled primary solvent to the main treater at a point several stages below the top, distilling and stripping the raffinate and extract solutions, recovering distilled primary solvent and returning the same to the top of the main treater, recovering secondary solvent and returning the same to the bottom of said second countercurrent phase treating tower.

5. Process in accordance with claim 4 in which said solvent is phenol and said secondary solvent is a highly paraffinic petroleum oil solvent.

6. Process in accordance with claim 4 in which said solvent is phenol and said major quantity of said solvent is from 70 to 90%.

7. Improved process of solvent treating mineral oils comprising solvent treating a mineral oil charge stock in a primary countercurrent treating tower in a continuous manner with a primary solvent, the major quantity of which has not been distilled, producing a raffinate solution and a solvent extract solution, re-extracting the solvent extract solution in a second countercurrent phase treating tower with a secondary solvent, separating extract solution from primary solvent in said second treating tower, topping the primary solvent to an extent sufficient to at least partially dry the same in a stripping section and returning the topped but undistilled primary solvent to the primary treater at a point intermediate between the point of introduction of the mineral oil charge and the point of drawing off the raffinate solution, distilling and stripping the raffinate and extract solutions, recovering distilled primary solvent and returning the same to the primary treater at a point between the point of introduction of the undistilled solvent and the point of drawing off the raffinate solution, recovering distilled secondary solvent and returning the same to the second countercurrent phase treating tower.

8. Process in accordance with claim 7 in which water is injected in said primary treater at a point above or below the point of introduction of the mineral oil charge, and in which said water is regenerated by distillation.

9. Process in accordance with claim 7 in which the major component of said solvent is phenol, the secondary solvent is a highly paraffinic petroleum oil solvent and said major quantity of said solvent is from 60 to 95%.

10. Process of solvent treating mineral oils comprising contacting the oil in a continuous manner in a primary countercurrent treating tower with an undistilled major quantity of a primary solvent and with a minor quantity of a distilled primary solvent under conditions to produce a raffinate phase and a solvent extract phase, separating the respective phases, removing said primary solvent from the raffinate phase by distillation to produce a solvent-free raffinate, re-extracting the solvent extract phase in a secondary countercurrent treating tower with a secondary solvent selected from the class of solvents which have a preferential selectivity for the extract as compared to said primary solvent under conditions to form a secondary extract phase and a primary solvent phase in said secondary tower, separating the secondary solvent extract phase and removing the secondary solvent overhead from said extract by distillation, removing said primary solvent from said secondary treating tower and drying the same by topping the primary solvent to the desired extent in a solvent separator tower, returning the topped undistilled primary solvent to the primary tower at a point intermediate between the point of introduction of the feed oil charge and the point of drawing off the raffinate solution, removing the distilled overheads from said raffinate and extracts and introducing the same into said solvent separator tower, recovering distilled solvent and secondary solvent from said solvent separator tower, returning said distilled primary solvent to the primary tower at a point between the point of introduction of the undistilled solvent and the point of drawing off the raffinate solution, returning distilled secondary solvent to said secondary countercurrent treating tower.

11. Process in accordance with claim 10 in which said primary solvent is phenol and said secondary solvent is a highly paraffinic petroleum oil solvent boiling in the range from about 200 to 600° F. and having an average boiling point in the range from about 360° F. to 400° F.

GEORGE T. ATKINS, Jr.